(12) United States Patent
Rudrapatna

(10) Patent No.: US 8,369,864 B2
(45) Date of Patent: Feb. 5, 2013

(54) INTER-SECTOR MACRODIVERSITY INTERFERENCE CANCELLATION AND SCHEDULING

(75) Inventor: Ashok N. Rudrapatna, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 1269 days.

(21) Appl. No.: 12/139,603

(22) Filed: Jun. 16, 2008

(65) Prior Publication Data

US 2009/0312042 A1    Dec. 17, 2009

(51) Int. Cl.
*H04W 72/00* (2009.01)
(52) U.S. Cl. .............. 455/452.2; 455/423; 455/63.2; 455/67.11; 455/295; 455/283
(58) Field of Classification Search .............. None
See application file for complete search history.

(56) References Cited

U.S. PATENT DOCUMENTS

2012/0128087 A1* 5/2012 Miyoshi et al. ............... 375/260

* cited by examiner

*Primary Examiner* — Philip Sobutka
(74) *Attorney, Agent, or Firm* — Williams, Morgan & Amerson

(57) ABSTRACT

The present invention provides a method for interference cancellation in a wireless communication system. One embodiment of a method includes accessing information indicative of one or more first signals transmitted by one or more first mobile units from one or more first sectors. The method also includes accessing information indicative of one or more second signals transmitted by one or more second mobile units from one or more second sectors different than the first sectors. The method further includes canceling interference caused in the second signal(s) by the first signal(s) using the accessed information indicative of the first signal(s) and the second signal(s). The method also includes jointly scheduling and allocating resources to one or more mobile stations in one or more sectors of one or more base stations.

20 Claims, 3 Drawing Sheets

INTER-SECTOR MACRODIVERSITY INTERFERENCE CANCELLATION AND SCHEDULING

BACKGROUND OF THE INVENTION

1. Field of the Invention

This invention relates generally to communication systems, and, more particularly, to wireless communication systems.

2. Description of the Related Art

Wireless communication systems typically include base stations that provide wireless connectivity to a geographical area such as a cell or a sector of a cell. The base stations communicate with mobile units in the cell or sector over an air interface. The air interface supports downlink (or forward link) communication from the base station to the mobile unit and uplink (or reverse link) communication from the mobile unit to the base station. The uplink and downlink communication uses corresponding uplink and downlink channels, which may be defined temporally, in frequency space, spatially, orthogonal codes, or combinations thereof. Examples of standards and are protocols that are used to define uplink and/or downlink channels include Time Division Multiple Access (TDMA), Frequency Division Multiple Access (FDMA), Multiple Input Multiple Output (MIMO), Code Division Multiple Access (CDMA), Orthogonal Frequency Division Multiple Access (OFDMA), Single Carrier Frequency Division Multiple Access (SC-FDMA), and the like.

Performance of the uplink channels is typically very sensitive to interference caused by transmissions on other uplink and/or downlink channels. For example, if the uplink channels are not orthogonal to each other, the performance of an uplink channel from a first mobile unit to a base station may be limited by interference caused by transmission on other uplink channel from a second mobile unit to the base station. Conversely, uplink transmissions from the first mobile unit may cause interference that limits the performance of the second mobile unit. Even uplink channels that are orthogonal within a sector are seldom orthogonal across sectors. Thus, uplink transmissions from different mobile units across different sectors to different base stations almost always cause mutual interference. Uplink power control and fractional frequency reuse techniques may be used to reduce interference between non-orthogonal uplink channels. These techniques typically yield modest capacity gains particularly for users near a cell edge. However, they often come at the cost of overall reduction in sector throughput. Orthogonality between the channels can also reduce interference between the orthogonal uplink and/or downlink channels. However, the uplink performance of orthogonal systems such as OFDMA, FDMA, TDMA, and SC-FDMA may still be significantly impacted by interference from uplink transmissions in other sectors or cells.

A base station may also use decoded symbols transmitted over the uplink by one mobile unit in a cell or sector to estimate the interference caused by the mobile unit. The decoded interference signals after reconstructing what was transmitted may then be removed from the received uplink signals of other mobile units in the cell or sector. This technique, which is typically referred to as interference cancellation, may reduce the mutual interference between mobile units within a cell or sector. However, the uplink performance may still be significantly impacted by interference from uplink transmissions in other sectors or cells.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for interference cancellation in a wireless communication system. One embodiment of a method includes accessing information indicative of one or more first signals transmitted by one or more first mobile units from one or more first sectors. The method also includes accessing information indicative of one or more second signals transmitted by one or more second mobile units from one or more second sectors different than the first sectors. The method further includes canceling interference caused in the second signal(s) by the first signal(s) using the accessed information indicative of the first signal(s) and the second signal(s).

In another embodiment, a method is provided for scheduling mobile units based upon estimated effects of interference cancellation in a wireless communication system. One embodiment of the method includes accessing information indicative of first signals transmitted by a first mobile unit from a first sector and accessing information indicative of second signals transmitted by a second mobile unit from a second sector different than the first sector. The method also includes estimating a channel quality performance metric of either the first mobile unit or the second mobile unit when mutual interference between the first and second mobile units is canceled using the accessed information. The method further includes allocating resources to the first mobile unit or the second mobile unit based on the estimated channel quality performance metric.

In yet another embodiment, a method is provided for scheduling mobile units based upon estimated effects of interference cancellation in a wireless communication system. One embodiment of the method includes accessing information indicative of first signals transmitted by a first mobile unit from a first sector and accessing information indicative of second signals transmitted by a second mobile unit from a second sector different than the first sector. The method also includes estimating a channel quality performance metric of either the first mobile unit or the second mobile unit using the accessed information. The method further includes allocating resources to the first mobile unit or the second mobile unit based on the estimated channel quality performance metric.

In yet another embodiment, a method is provided for scheduling mobile units without taking into account estimated effects of interference cancellation i.e., in the presence of mutual inter-sector interference in a wireless communication system. One embodiment of the method includes accessing information indicative of first signals transmitted by a first mobile unit from a first sector and accessing information indicative of second signals transmitted by a second mobile unit from a second sector different than the first sector. The method also includes estimating a channel quality performance metric of either the first mobile unit or the second mobile unit using the accessed information. The method further includes allocating resources to the first mobile unit or the second mobile unit based on the estimated channel quality performance metric.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
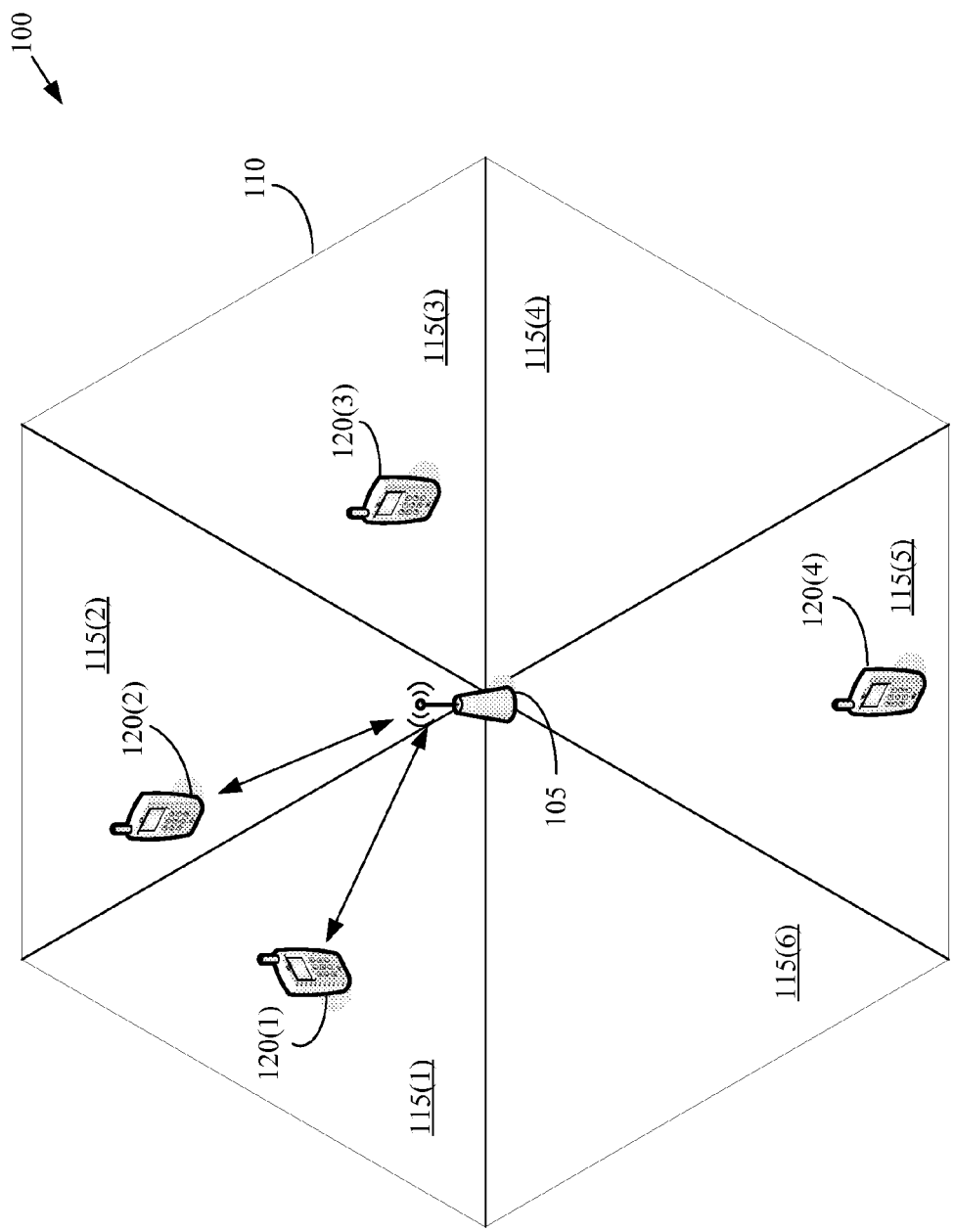
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, the wireless communication system 100 includes a base station 105 that provides wireless connectivity to a cell 110 that is divided up into multiple sectors 115 (1-6). The indices (1-6) may be dropped when referring to the sectors 115 collectively. This convention may be applied to other elements depicted in the drawings and referred to using a reference numeral and one or more distinguishing indices. Although FIG. 1 depicts a cell 110 that is divided into six sectors 115, persons of ordinary skill in the art having benefit of the present disclosure should appreciate that other embodiments may divide the cell 110 into more or fewer sectors 115. For example, the cell 110 may be implemented as a single sector 115 or as three sectors 115. Furthermore, although the cell 110 and the sectors 115 are depicted as a hexagon and triangles, respectively, actual cells 110 and/or sectors 115 are irregularly shaped because of variations in the coverage area caused by obstructions, environmental conditions, beamforming techniques, and the like.

The base station 105 typically provides independent coverage to the sectors 115. In one embodiment, the base station 105 may include multiple antennas, radios, and/or other hardware and software so that concurrent coverage may be provided to the sectors 115. For example, the base station 105 may include six antennas (not shown in FIG. 1) for providing coverage to the six sectors 115. Each of the antennas may be coupled to a separate transceiver that may be used to support uplink and/or downlink communication to mobile units 120 within the corresponding sectors 115. Techniques for establishing, maintaining, and/or tearing down wireless communication links between the base station 105 and mobile units 120 are known in the art and in the interest of clarity only those aspects of establishing, maintaining, and/or tearing down wireless communication links that are relevant to the present invention will be discussed herein.

The mobile units 120 in different sectors 115 can mutually interfere with each other. For example, if the mobile unit 120(1) has established a wireless communication link with the elements of the base station 105 that provide wireless connectivity to the sector 115(1) and the mobile unit 120(2) has established a wireless communication link with the elements of the base station 105 that provide wireless connectivity to the sector 115(2), then the signals transmitted over these wireless communication links may interfere with each other. For example, a portion of the uplink transmissions from the mobile unit 120(1) may be received as noisy interference by the elements of the base station 105 that provide wireless connectivity to the sector 115(2). Conversely, a portion of the uplink transmissions from the mobile unit 120(2) may be received as noisy interference by the elements of the base station 105 that provide wireless connectivity to the sector 115(1). The amount of mutual interference may be a function of the locations of the mobile units 120 within their sectors 115, the sidelobe patterns of the antennas associated with the sectors 115, environmental conditions, natural and/or man-made obstructions, and the like.

To reduce the mutual interference between mobile units 120 within different sectors 115, the wireless communication system 100 employs macro-diversity combining of signals from the mobile units 120 across the multiple sectors 115. In one embodiment, the base station 105 attempts to decode signals received over the uplink from one or more of the mobile units 120. If the uplink signal from one of the mobile units 120 is successfully decoded, then the decoded information may be used to cancel interference associated with the mobile unit 120 in other sectors 115. For example, if an uplink signal from the mobile unit 120(1) is successfully decoded, then successive interference cancellation (SIC) can be employed to significantly improve the decoding probability of the uplink signals received from the mobile unit 120(2) or other mobile units 120(3-4). The receiver algorithm may employ techniques such as demodulation, Maximum Ratio Combining (MRC), or Minimum Mean Squared Error (MMSE), Maximum Likelihood (ML) detection, and the like. Alternatively, multi-user detection (MUD) of the multiple mutual interferers can be employed to recover all the signals from the mobile units 120 in the various sectors 115. For example, MMSE (with or without SIC or MUD) techniques applied across multiple sectors 115 of the base station 105 and across the multiple signal and interference sources as seen at multiple antennas of the multiple sectors 115 may offer a significant reduction in the mutual interference with a resulting improvement in SINR.

Successive interference cancellation over the mobile units 120 in multiple sectors 115 may also be employed when the uplink signals have not been successfully decoded. In one embodiment, soft symbols (prior to decoding) transmitted over an uplink by one of the mobile units 120 after demodulation can be cancelled from the other raw signals before demodulation and decoding of uplink transmissions from other mobile units 120 in other sectors 115. This technique is sometimes referred to as soft decision interference cancellation (SDIC), while post decoded interference cancellation (IC) is referred to hard decision IC (HDIC). This approach can be attempted for each of the multiple mutually interfering sources. For example, if the base station 105 is not able to decode any of the uplink signals from the mobile units 120, the base station 105 may use the demodulated uplink signals from mobile units 120 in one sector 115 to perform interference cancellation in raw signals transmitted by mobile units 120 in other sectors 115.

The wireless communication system 100 may also implement inter-sector joint scheduling and/or resource management algorithms (RRMs). In the illustrated embodiment, the wireless communication system 100 may use estimates of the performance gains from successive interference cancellation, either HDIC or SDIC over the multiple sectors 115 to determine how to schedule uplink transmissions from the mobile units 120 and/or how to allocate resources for the uplink transmissions. For example, an RRM algorithm implemented in the wireless communication system 100 may jointly schedule uplink transmissions for the multiple mobile units 120 in multiple sectors 115, select one or more of the mobile units 120, and/or assign resources to those selected users in an optimal multi-sector manner. Exemplary resources that may be allocated by the RRM algorithm include, but are not limited to, power, time slots, band width, antenna elements, and other radio resources. If multi-sector RRM (MSRRM) is used in conjunction with the macro-diversity interference cancellation (MDIC) techniques described herein, the RRM algorithm may take into account post IC performance in addition to traditional RRM metrics such as buffer state, time of arrival of packets, quality of service deadline, channel quality, and the like to optimize overall multi-sector performance. Optimization may involve maximizing multi-sector throughput, cell/sector edge user rates, user grade/quality of service, etc. If MSRRM is used without using MDIC, the RRM algorithm may function like a normal single sector RRM except that network and user performance may be optimized on a multi-sector basis. With MSRRM with or without MDIC, mobile stations in multiple sectors are jointly scheduled taking into account joint performance of simultaneous mobile station transmissions from different sectors taking into account the performance achieved with or without MDIC respectively.

Figure 2:
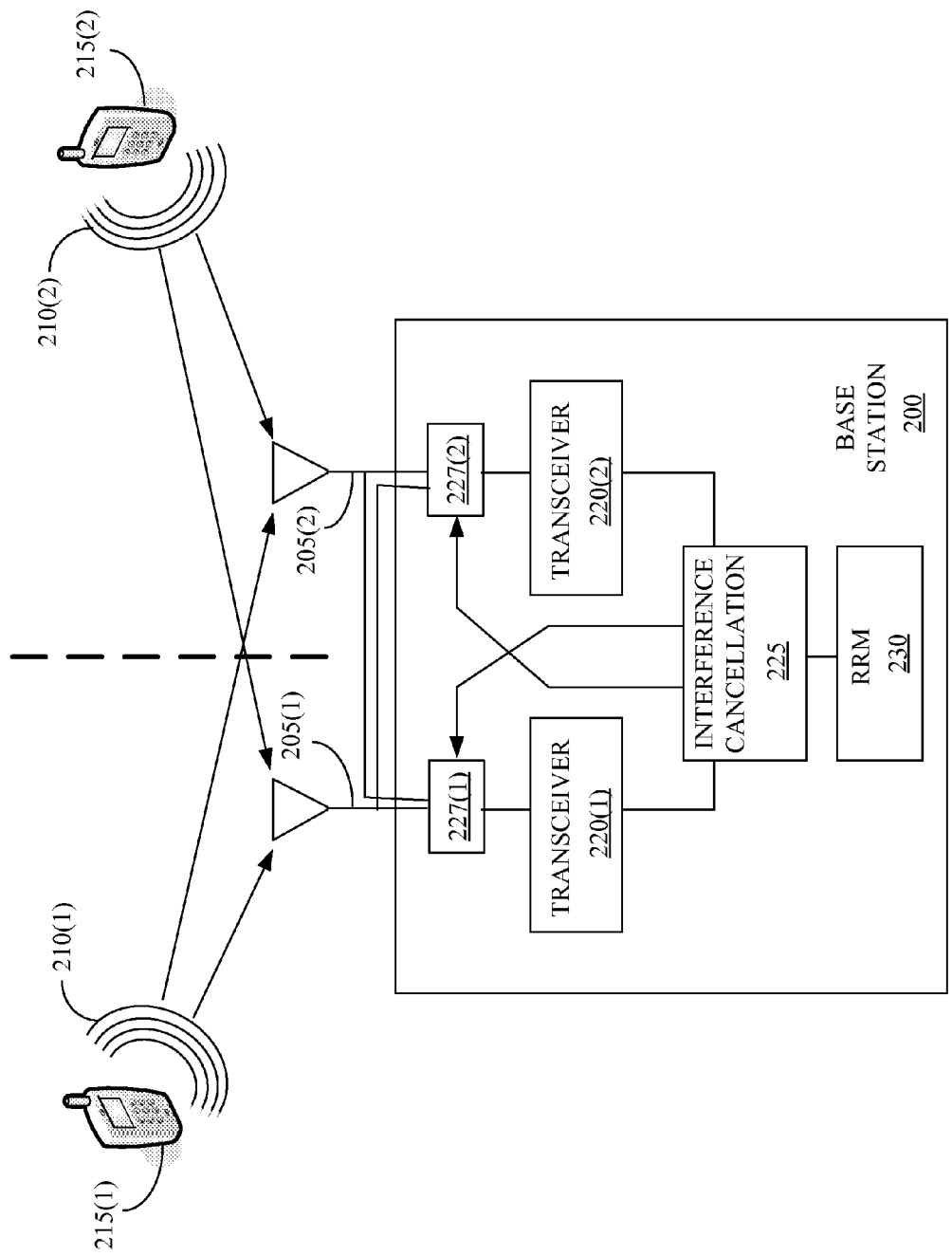
FIG. 2 conceptually illustrates one exemplary embodiment of a base station.

FIG. 2 conceptually illustrates one exemplary embodiment of a base station 200. In the illustrated embodiment, the base station 200 is coupled to multiple antennas 205 that provide wireless connectivity to multiple sectors, as indicated by the dashed line. Although a single antenna 205 is depicted as providing wireless connectivity to a single sector, in alternative embodiments multiple antennas 205 may provide wireless connectivity to each of sector. Furthermore as illustrated in FIG. 2, a single sector base station or receiver may be connected to multiple antennas in multiple sectors. The base station 200 shown in FIG. 2 has established wireless communication links using an air interface 210 (supported by one or more antennas 205) with mobile units 215 in the different sectors. Uplink and downlink transmissions over the wireless communication links 210 are handled by the transceivers 220 in the base station 200. The transceivers 220 implement functionality for modulating, encoding, demodulating, and decoding signals, as well as other functionality as needed. Although multiple antennas 205 coupled to two transceivers 220 are depicted in FIG. 2, persons of ordinary skill in the art having benefit of the present disclosure should appreciate that any number of antennas 205 and/or transceivers 220 may be implemented in different embodiments of the base station 200.

In operation, each transceiver 220 attempts to demodulate and decode signals received from the mobile units 215 via the corresponding antennas 205. If both transceivers 220 successfully decode the signals received over the corresponding antennas 205, then no further actions other than what is normally done is needed and the demodulated and decoded symbols can be provided to other functionality in the base station 200 such as forwarding the decoded data to the destination. However, if one or more of the transceivers 220 does not successfully demodulate or decode the received signals, then a multi-sector interference cancellation technique may be employed by the base station 200.

In one embodiment, the base station 200 employs successive interference cancellation using demodulated and/or decoded uplink signals that are communicated from the transceivers 220 to an interference cancellation element 225. For example, if the transceiver 220(1) successfully decodes an uplink signal from the mobile unit 215(1), the decoded uplink signal may be communicated to the interference cancellation element 225, which may reconstruct a portion or all of the received signal corresponding to the decoded signal. The reconstructed signal is then provided to a buffer element 227(2) that is configured to store the reconstructed portion of the signal and/or a corresponding portion of the original signal received at the antenna 205(2). In one embodiment, the reconstructed signal and the original received signal correspond to signals received during the same time period and are stored as oversampled baseband signals.

The buffer elements 227(2) may then subtract the reconstructed portion of the signal from the antenna 205(1) from the stored portion of the signal from the antenna 205(2), thereby performing HDIC and transmit the result to the transceiver 220(2). Subtracting the reconstructed portion of the signal from the signal received at the antenna 205(2) may cancel interference associated with signals transmitted by the mobile units 215(1) and improve the probability that the transceiver 220(2) successfully decodes signals received from the mobile unit 215(2). In various alternative embodiments, the interference cancellation element 225 and/or the buffer elements 227 may be implemented as functional entities within the base station 200, within one or more of the transceivers 220, or as one or more stand-alone entities separate from the base station 200.

In alternative embodiments, interference cancellation may be used to improve the probability of successfully decoding signals even if neither of the transceivers 220 successfully decoded a received signal. For example, if one of the transceivers 220 successfully demodulated a received signal, the interference cancellation element 225 may receive demodulated signals and use the demodulated signals to reconstruct a portion of the received signal corresponding to the demodulated signal. The reconstructed signal may then be provided to the buffer units 227 to perform interference cancellation, thereby performing SDIC for mobile units 215 in different sectors that mutually interfere with each other. If one or more of the transceivers 220 successfully decodes a received signal using the reconstructed portion, then the interference cancellation element 225 may use the decoded signal to reconstruct a portion of the received signal and the reconstructed portion may be used in an additional iteration of the successive interference cancellation algorithm on the first signal that was not successfully decoded.

In another alternative embodiment, interference cancellation across the multiple sectors can be performed independently by the transceivers 220. For example, the transceivers 220 may perform interference cancellation for signals received across multiple sectors, e.g., signals received from both of the mobile unit 215. Non-successive interference cancellation techniques may be less complicated to implement because they do not require transmitting information from one receive path (e.g., the receive path including the antenna 205(1), the buffer 227(1), and the transceiver 220(1)) to another receive path (e.g., the receive path including the antenna 205(2), the buffer 227(2), and the transceiver 220 (2)). The non-successive interference cancellation algorithm may implement receiver algorithm techniques such as demodulation and Maximum Ratio Combining (MRC), or Minimum Mean Squared Error (MMSE), ML and the like. Alternatively, multi-user detection (MUD) of the multiple mutual interferers can be employed to recover all the signals from the mobile units 215 in the various sectors.

The illustrated embodiment of the base station 200 also includes a radio resource management (RRM) function 230. As discussed herein, the radio resource management function 230 may jointly schedule and manage the resources associated with mobile units 215 in different sectors. For example, the radio resource management function 230 may communicate with the interference cancellation element 225 to acquire information that can be used to estimate the performance of the base station 200 when successive interference cancellation (or macro-diversity interference cancellation or non-successive interference cancellation) is used to cancel mutual interference between the mobile units 215 in different sectors. For example, the acquired information may be used to estimate one or more channel quality performance metrics. The acquired information may include measures of the signal quality associated with the mobile unit 215 before and/or after interference cancellation, frame error rates, and the like. Mobile units 215 may use the allocated resources to transmit signals to the base station 200, which may perform interference cancellation algorithms to remove or cancel mutual interference between the mobile units 215, as discussed herein.

Figure 3:
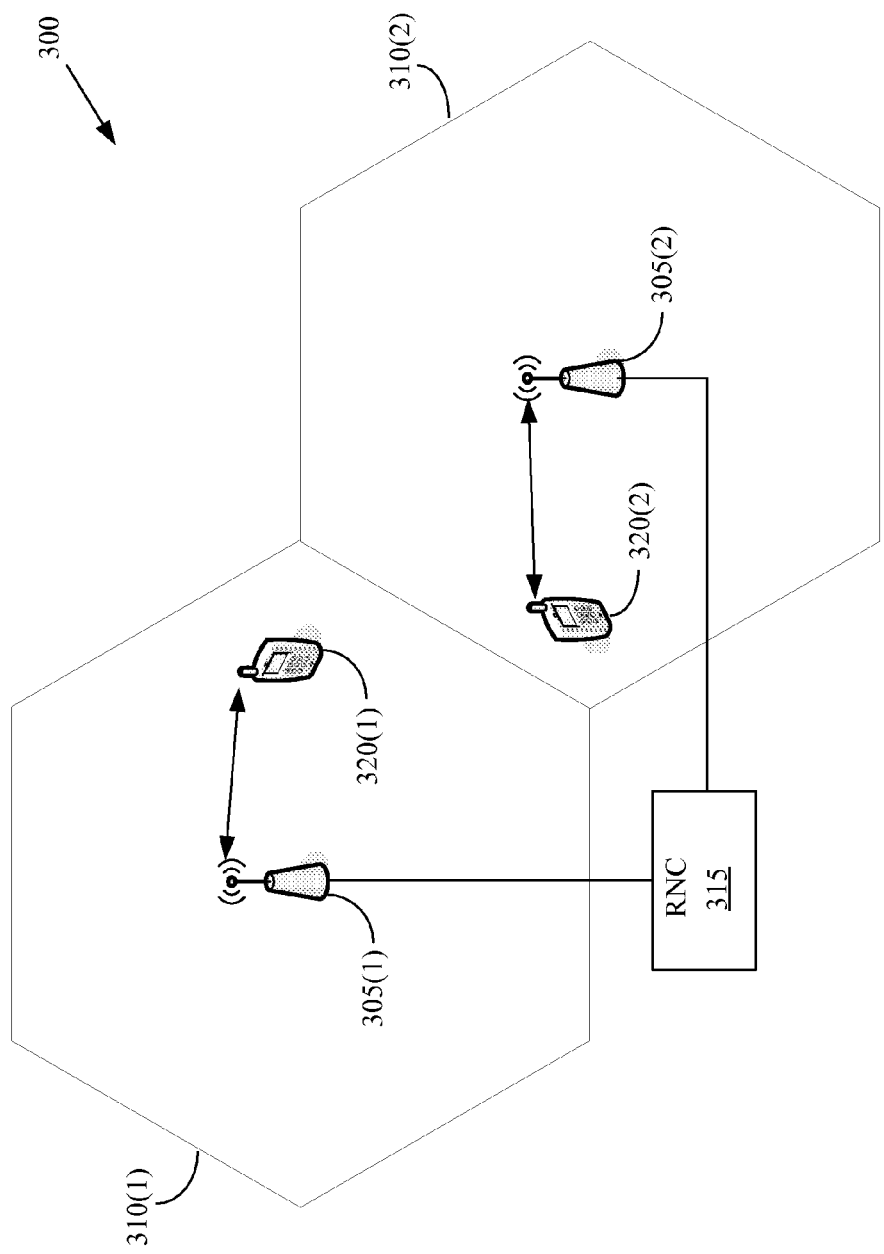
FIG. 3 conceptually illustrates a second exemplary embodiment of a wireless communication system.

FIG. 3 conceptually illustrates a second exemplary embodiment of a wireless communication system 300. In the illustrated embodiment, the wireless communication system 300 includes multiple base stations 305 that provide wireless connectivity to multiple cells 3 10. Although not depicted in FIG. 3, the cells 310 may also be further subdivided into multiple sectors that are served by multiple antennas at the base station 305. The base stations 305 can communicate with each other via a radio network controller (RNC) 315 or directly. However, persons of ordinary skill in the art having benefit of the present disclosure should appreciate that the base station 305 may also communicate via other communication pathways.

Mobile units 320 can mutually interfere with each other across cell boundaries. Demodulated and/or decoded uplink signals received from the mobile units 320 may therefore be used to perform macro-diversity interference cancellation across the multiple cells 310. For example, demodulated and/ or decoded signals from the base station 305(1) may be used to perform the successive interference cancellation on the signals received at the base station 305(2). In one embodiment, the interference cancellation can be performed at the radio network controller 315 using reconstructed demodulated signals, and/or decoded signals, and/or raw signals transmitted to the radio network controller 315 by the base stations 305. However, in alternative embodiments, the interference cancellation can be performed at any location within the wireless communication system 300 by any functional entity or combination of functional entities.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:
1. A method, comprising:
   accessing information indicative of at least one first signal transmitted by at least one first mobile unit from at least one first sector;

accessing information indicative of at least one second signal transmitted by at least one second mobile unit from at least one second sector different than said at least one first sector;

canceling interference caused in said at least one second signal by said at least one first signal using the accessed information indicative of said at least one first signal and said at least one second signal;

estimating channel quality performance metric of at least one of the first mobile unit or the second mobile unit when mutual interference between the first and second mobile units is canceled either with demodulation or with demodulation followed by decoding; and allocating resources to at least one of the first mobile unit or the second mobile unit based on the estimated channel quality performance metric.

2. The method of claim 1, wherein accessing the information indicative of said at least one first signal and said at least one second signal comprises accessing said information following reception of said first and second signals at a base station serving said first and second sectors.

3. The method of claim 1, wherein accessing information indicative of said at least one first signal and said at least one second signal comprises:

accessing the information indicative of said at least one first signal following reception of said at least one first signal at a first base station; and receiving the information indicative of said at least one second signal from a second base station following reception of said at least one second signal at the second base station.

4. The method of claim 1, wherein canceling the interference caused in said at least one second signal by said at least one first signal comprises demodulating said at least one first signal.

5. The method of claim 4, wherein canceling the interference comprises using said at least one demodulated first signal to cancel interference in said at least one second signal prior to demodulating said at least one second signal.

6. The method of claim 4, wherein canceling the interference comprises decoding said at least one demodulated first signal.

7. The method of claim 6, wherein canceling the interference comprises using said at least one decoded first signal to cancel interference in said at least one second signal prior to decoding said at least one second signal.

8. The method of claim 1, wherein canceling the interference comprises canceling the interference using successive interference cancellation with at least one of maximum ratio combining or minimum mean squared error or maximum likelihood detection.

9. The method of claim 1, wherein canceling the interference comprises canceling the interference using non-successive interference cancellation with at least one of maximum ratio combining or minimum mean squared error or maximum likelihood detection.

10. The method of claim 1, wherein allocating resources comprises at least one of jointly scheduling the first and second mobile units, selecting at least one of the first and second mobile units for transmission, and assigning resources to at least the selected first and second mobile units.

11. The method of claim 1, wherein allocating resources comprises allocating the resources based on at least one of a buffer state, a time of arrival of packets, a quality of service deadline, or a channel quality.

12. A method, comprising:

accessing information indicative of at least one first signal transmitted by at least one first mobile unit from at least one first sector;

accessing information indicative of at least one second signal transmitted by at least one second mobile unit from at least one second sector different than said at least one first sector;

estimating a channel quality performance metric of at least one of the first mobile unit or the second mobile unit when mutual interference between the first and second mobile units is canceled using the accessed information indicative of said at least one first signal and said at least one second signal; and allocating resources to at least one of the first mobile unit or the second mobile unit based on the estimated channel quality performance metric.

13. The method of claim 12, wherein allocating resources comprises allocating the resources based on at least one of a buffer state, a time of arrival of packets, a quality of service deadline, or a channel quality.

14. The method of claim 12, comprising receiving at least one third signal transmitted by said at least one first mobile unit using the allocated resources and at least one fourth signal transmitted by said at least one second mobile unit using the allocated resources.

15. The method of claim 14, comprising canceling interference caused in said at least one fourth signal by said at least one third signal using accessed information indicative of said at least one third signal and said at least one fourth signal.

16. A method, comprising:

accessing information indicative of at least one first signal transmitted by at least one first mobile unit from at least one first sector;

accessing information indicative of at least one second signal transmitted by at least one second mobile unit from at least one second sector different than said at least one first sector;

estimating a channel quality performance metric of at least one of the first mobile unit or the second mobile unit using the accessed information indicative of said at least one first signal and said at least one second signal; and allocating resources to at least one of the first mobile unit or the second mobile unit based on the estimated channel quality performance metric.

17. The method of claim 16, wherein allocating resources comprises allocating the resources based on at least one of a buffer state, a time of arrival of packets, a quality of service deadline, or a channel quality.

18. The method of claim 16, wherein estimating the channel quality performance metric comprises estimating the channel quality performance metric when mutual interference between the first and second mobile units is canceled using the accessed information indicative of said at least one first signal and said at least one second signal.

19. The method of claim 16, comprising receiving at least one third signal transmitted by said at least one first mobile unit using the allocated resources and at least one fourth signal transmitted by said at least one second mobile unit using the allocated resources.

20. The method of claim 19, comprising canceling interference caused in said at least one fourth signal by said at least one third signal using accessed information indicative of said at least one third signal and said at least one fourth signal.

* * * * *